UNITED STATES PATENT OFFICE.

ROBERT V. JONES, OF CANTON, OHIO.

IMPROVEMENT IN LININGS FOR OIL-BARRELS.

Specification forming part of Letters Patent No. 57,333, dated August 21, 1866.

*To all whom it may concern:*

Be it known that I, ROBERT V. JONES, of Canton, Stark county, Ohio, have invented certain new and useful Improvements in Linings for Oil-Barrels; and I do hereby declare that the following is a full, clear, and exact description of the same.

My invention consists in the admixture of certain ingredients for the purpose of lining petroleum or other oil barrels, to prevent the oil from oozing out of the cracks of the barrels. For this purpose I use slippery-elm bark, (pulverized,) white glue, and gum-copal, or copal-varnish, and mix them in the following manner: The white glue should be dissolved in water in the usual way. The gum-copal should be dissolved in a copper kettle, with spirits of turpentine added to it until it is of the consistency of honey. The slippery-elm bark (pulverized) should be dissolved in warm water and strained. After the same is perfectly dissolved, then add the entire ingredients together and boil them until they are the consistency of paint, and then apply to the barrel with a brush while the mixture is hot. After being applied to the barrel and dried the invention assumes somewhat the looks of parchment, and prevents the leakage of oil from the barrels.

Having thus fully described my invention, what I claim as new, and desire to secure by Letters Patent, is—

The within-mentioned ingredients, when mixed together and used as and for the purposes herein specified.

As evidence that I claim the foregoing I have hereunto set my hand in the presence of two witnesses.

ROBERT V. JONES.

Witnesses:
W. W. CLARK,
J. J. CLARK.